Oct. 19, 1948.     M. LANDOW     2,451,565
CHUCK ADAPTER
Filed Nov. 13, 1945

INVENTOR
Mitchell Landow
BY Henry J. E. Metzler
Agt.

Patented Oct. 19, 1948

2,451,565

UNITED STATES PATENT OFFICE 2,451,565

CHUCK ADAPTER

Mitchell Landow, Bronx, N. Y.

Application November 13, 1945, Serial No. 628,105

2 Claims. (Cl. 279—1)

The present invention relates to improvements in chucks, and has particular reference to chucks used in connection with a lathe or similar machinery for holding a tool or an object to be worked on.

In machines of this character, accuracy and trueness are the principal considerations, and in the present invention it is proposed to provide a new and improved device for tightening or releasing the chuck jaws. More specifically, my device, which I call a "chuck adapter," can be used as a substitute for and is highly superior over chuck operating keys of the class described in the U. S. Patent No. 2,012,147.

The hitherto known chuck keys are a source of frequent trouble for the operators of lathes, drill presses and the like because of the common occurrence of the loose gear key becoming lost and making it impossible to operate the chuck without damaging the gear teeth on the lower extremity of the outer chuck member.

Therefore, the main object of the present invention is the provision of a device of the character described which makes the small key gear an integral part of the chuck, fastened in its proper place, meshing correctly and solidly in relation to the gear teeth of the chuck.

This results in easier operation, less effort for the operator and eliminates wear of the gear teeth due to improper meshing.

Another object of the present invention is the provision of a device of the character described which can be applied easily to any type or size chuck commonly used for holding drills, reamers, center drills, etc. in drill presses, lathes, etc., and which provides a means of tightening the jaws of the chuck with any ordinary wrench, adjustable ratchet or regular wrench or with any standard hexagon key.

Still another object of the present invention is the provision of a device of the character described which affords protection against personal injuries of operators and against damaging of the chuck in that it covers all the important parts of the chuck, namely the small gear, the gear teeth on the chuck, and the jaws of the chuck which hold the drill etc.; these jaws protrude from the chuck and when mutilated impair the efficiency of the chuck by revolving the drill etc., off center. This adapter covers all these important working parts and eliminates the danger of incorrect work due to mutilation of the chuck, and it also prolongs the life and increases the efficiency of the chuck.

Yet still another object of the present invention is the provision of a device of the character described which is simple in construction, inexpensive to manufacture, small in size, light in weight, and which can be attached easily to any existing chuck without any changes of the chuck itself, but which can also be manufactured as a unit with new chucks.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing.

Similar numerals refer to similar parts throughout the several views.

Figure 1:
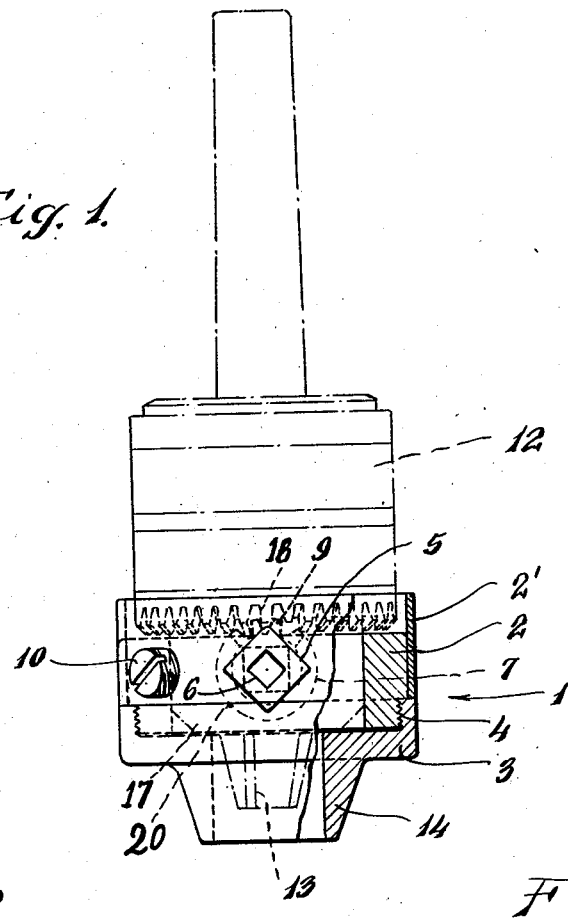
Figure 1 is a side elevation of a preferred embodiment of my invention, partially in longitudinal section, showing the device as it appears when it is attached to a chuck which is indicated in dash-and-dotted lines.
Figure 2:
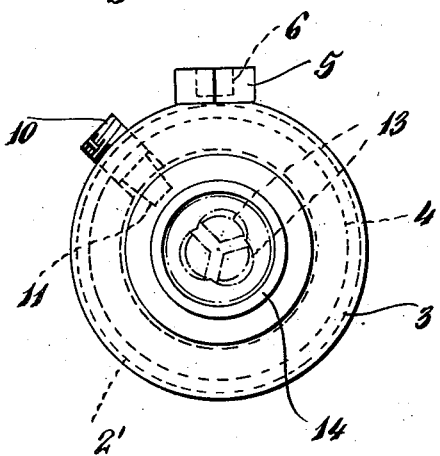
Figure 2 is a bottom plan view of the embodiment of Figure 1.
Figure 3:
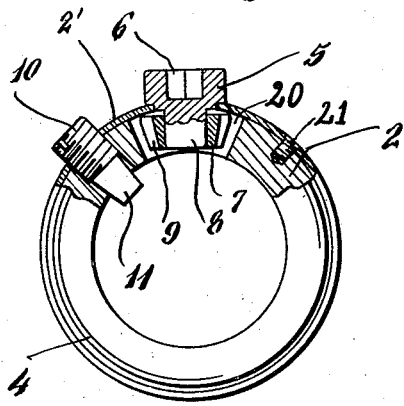
Figure 3 is a top plan view of the device without a chuck.

In the drawing the numeral 1 denotes a chuck adapter according to the present invention, which consist mainly of a tubular member 2 that fits tightly over the lower portion of the chuck body and which has in its upper wall portion a recess 20, and of a pinion 7 having circumferentially arranged teeth 9 and being rotatably arranged in the recess 20. The outer diameter of the tubular member 2 is somewhat larger than the outer diameter of the outer chuck member 12, and a sleeve member 2' is attached to the outer side of the tubular member 2, and extends over the upper edge of the tubular member 2, so that its upper portion covers the teeth 18 of the chuck member 12. The sleeve member 2' is secured to the tubular member 2 by any suitable means, for instance by means of one or more screws 21 as may be seen in Figure 3, or it may be made as a unit with the tubular member 2. A collar 3, which has a reduced lower portion 14, is attached to the lower portion of the tubular member 2 by means of a screw connection 4 or in any other suitable manner, and its portion 14 protrudes over the chuck jaws 13 as illustrated in Figure 1. The shaft 8 of the pinion 7 extends radially through an aperture in the upper portion of the sleeve member 2', and the upper sector of the row of teeth 9 protrudes over the upper edge of the tubular member 2, so that the teeth 9 of pinion 7—which is preferably a bevel gear—engage the teeth 18 of the chuck member 12. That portion of the shaft 8 which protrudes over the outer side of the sleeve member 2' is widened so as to form a hub 5, which is square or polygon at its outer side and which has a square or polygon bore 6 in its center. The pinion 7 is secured to the shaft 8 in any suitable manner or is formed as a unit with shaft 8 or the like. A screw 10 which has a conical end portion 11 is screwed radially through a threaded bore in the tubular member 2, so that its end portion 11 engages one of the radial bores in the lower portion of the chuck body 17. Such radial bores are provided in the presently used chuck bodies for inserting therein a pin of a chuck key of the type described in the U. S. Patent No. 2,012,147. The screw 10 thus constitutes a very simple, practical, and handy means for securing my new and improved chuck adapter 1 to an existing chuck.

The hub 5 can be turned in either direction by means of any suitable tool which the operator has at hand, for instance by means of an ordinary wrench, a hexagon standard key, or the like. When the hub 5 is turned the pinion 7 turns the chuck member 12 relative to the chuck body 17 in the same manner as if the teeth 18 were engaged by a chuck gear key, so that the chuck jaws 13 can be released or tightened.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

Having thus fully described my said invention, what I claim as new and desire to secure by Letters Patent is:

1. A device of the character described comprising a tubular casing whose inner side fits tightly over the lower portion of a chuck body and which is wider in diameter than the outer chuck member and has a recess in its upper wall portion, a sleeve member secured to the outer side of said tubular casing and extending over the upper edge of the latter, a bevel gear having its hub radially extended through said sleeve member and being rotatably arranged in the recessed portion of said casing in such a manner that some of its teeth protrude over the upper edge of said tubular member, and a collar member attached to the lower portion of said tubular member and extending over the jaws of said chuck, said gear being adapted to engage teeth which are on the lower extremity of the outer chuck member, and that portion of said hub which projects over the outer side of said sleeve member being adapted to be rotated by means of a wrench, all substantially as described.

2. An adapter for drill chucks which have rotatably mounted on the body a sleeve that is operatively connected with the chuck mechanism and whose lower end is provided with circumferentially arranged teeth, said adapter comprising a tubular casing whose inner side is fitted to engage the lower portion of the chuck body and which has a recess in the inner side of its upper portion, a gear having its hub radially extended through the outer wall of the recessed portion of said casing and being rotatably arranged in the recess in such a manner that some of its teeth protrude over the upper edge of said tubular casing, a collar member attached to the lower portion of said tubular casing and extending over the jaws of said chuck, and a threaded pin secured radially through a threaded bore in said casing and adapted to engage a radial hole in the chuck body, said gear being adapted to engage the teeth which are circumferentially arranged on the lower extremity of the sleeve which is rotatable on said chuck body, and that portion of said hub which projects over the outer side of said tubular casing being adapted to be rotated by means of a wrench, all substantially as described.

MITCHELL LANDOW.

REFERENCES CITED

The following references are of record in the file of this patent:

UNITED STATES PATENTS

| Number | Name | Date |
|---|---|---|
| 638,905 | Casler | Dec. 12, 1899 |
| 896,663 | Rahm | Aug. 18, 1908 |
| 1,007,786 | Kadow | Nov. 7, 1911 |
| 2,376,594 | Hite | May 22, 1945 |

FOREIGN PATENTS

| Number | Country | Date |
|---|---|---|
| 142,516 | Austria | Mar. 15, 1935 |